(12) United States Patent
Coffman et al.

(10) Patent No.: US 6,377,913 B1
(45) Date of Patent: Apr. 23, 2002

(54) METHOD AND SYSTEM FOR MULTI-CLIENT ACCESS TO A DIALOG SYSTEM

(75) Inventors: Daniel M. Coffman, Bethel, CT (US); Popani Gopalakrishnan, Yorktown Heights; Ganesh N. Ramaswamy, Ossining, both of NY (US); Jan Kleindienst, Kladno-Krochehlavy (CZ); Chalapathy V. Neti, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/374,026

(22) Filed: Aug. 13, 1999

(51) Int. Cl.$^7$ .......................... G10L 15/00; G10L 15/26
(52) U.S. Cl. .................. 704/8; 704/2; 704/9; 704/257; 704/258
(58) Field of Search ........................... 704/2, 8, 9, 257, 704/258; 709/203

(56) References Cited

U.S. PATENT DOCUMENTS

| | | | |
|---|---|---|---|
| 5,748,974 A | * 5/1998 | Johnson | 704/9 |
| 5,758,023 A | * 5/1998 | Bordeaux | 704/232 |
| 5,987,416 A | * 11/1999 | Matsumoto | 704/275 |
| 6,233,561 B1 | * 5/2001 | Junqua et al. | 704/277 |
| 6,246,981 B1 | * 6/2001 | Papineri et al. | 704/235 |
| 6,272,455 B1 | * 8/2001 | Hoshen et al. | 704/1 |
| 6,314,398 B1 | * 11/2001 | Junqua et al. | 704/257 |

OTHER PUBLICATIONS

Papineni et al., "Free–Flow Dialog Management Using Forms," Eurospeech, Budapest, Hungary, Sep. 1999.
Lamel et al., "The LIMSI ARISE System for Train Travel Information," International Conference on Acoustics, Speech and Signal Processing, Phoenix, Arizona, Mar. 1999.
Ward et al., "Towards Speech Understanding Across Multiple Languages," International Conference on Spoken Language Processing, Sydney, Australia, Dec. 1998.

* cited by examiner

*Primary Examiner*—Krisna Lim
(74) *Attorney, Agent, or Firm*—F. Chau & Associates, LLP

(57) ABSTRACT

In accordance with the invention, a method and system for accessing a dialog system employing a plurality of different clients, includes providing a first client device for accessing a conversational system and presenting a command to the conversational system by converting the command to a form understandable to the conversational system. The command is interpreted by employing a mediator, a dialog manager and a multi-modal history to determine the intent of the command based on a context of the command. A second client device is determined based on a predetermined device preference stored in the conversational system. An application is abstracted to perform the command, and the results of the performance of the command are set to the second client device.

29 Claims, 5 Drawing Sheets

METHOD AND SYSTEM FOR MULTI-CLIENT ACCESS TO A DIALOG SYSTEM

BACKGROUND OF THE INVENTION

1. Field of the Invention

The present invention relates to conversational computer systems, and more particularly to conversational systems with automatic speech recognition, natural language understanding and dialog management for multi-client access.

2. Description of the Related Art

State-of-the-art conversational systems such as those described in Lamel et al., "The LIMSI ARISE System for Train Travel Information," International Conference on Acoustics, Speech and Signal Processing, Phoenix, Arizona, March 1999 and Ward et al., "Towards Speech Understanding Across Multiple Languages," International Conference on Spoken Language Processing, Sydney, Australia, December 1998, have focused on a single access method (limited to either a desktop or a telephone). As more and more information is available in electronic form, with the information interaction becoming increasingly complex, it is desirable to provide access to information using the most natural and efficient interfaces. In particular, it is desirable to provide efficient interfaces with several devices (such as desktops, telephones and personal digital assistants (PDAs)) that can potentially be used to access information and to design interfaces that are similar and intuitive across a wide range of access methods and input/output modalities. However, such systems pose a design challenge due to the complexity needed to realize such a design.

Therefore, a need exists for a system and method for a multi-client access to a dialog system. A further need exists for a multi-client access system which provides an efficient platform for natural speech interaction.

SUMMARY OF THE INVENTION

In accordance with the invention, a method, which may be implemented by a program storage device readable by machine, tangibly embodying a program of instructions executable by the machine, for accessing a dialog system employing a plurality of different clients, includes providing a first client device for accessing a conversational system and presenting a command to the conversational system by converting the command to a form understandable to the conversational system. The command is interpreted by employing a dialog manager and a multi-modal history to determine the intent of the command based on a context of the command (and possibly a type of device employed to present the command). A second client device is determined based on a predetermined device preference stored in the conversational system. An application is abstracted to perform the command, and the results of the performance of the command are sent to the second client device.

In other methods, which may be implemented by a program storage device, the first client device may the same as the second client device or the second client device may be a plurality of client devices. The first client device and the second client device may include at least one of a telephone, a computer, a personal digital assistant or equivalent devices. The command may be presented in natural speech, the steps of recognizing the speech and converting the speech to a formal language may be included. The steps of outputting the results of the performance of the command to the second client device by speech synthesis may also be included. The command may be presented graphically, and the step of responding to the command by one or both of a graphical result and synthesized speech may be included. The step of providing a component abstraction interface to interface with applications such that the conversational system is shielded from details of execution of the application may be included. The step of querying a user via the first client device for information about the device preference and/or clarification of command information may also be included. The mediator preferably employs information about the first client device and/or the second client device to determine the context of the command.

A system for accessing a dialog system employing a plurality of different clients, in accordance with the invention, includes a device handling and abstraction system adapted to provide input and output interfacing to a plurality of different client devices. The device handling and abstraction system receives commands from at least one client device and converts the commands to a form acceptable to a conversational system. The conversational system is coupled to the device handling and abstraction system for receiving converted commands. The conversational system is adapted to interpret the converted commands based on a context of the command (and possibly the device used to present the command) to determine an appropriate application responsive to the converted command. The conversational system includes a device preference to which results of executing the converted commands are sent. An application abstraction system is coupled to the conversational system and is adapted for determining which applications are appropriate for executing the converted command. The application abstraction system is further adapted to interface with a plurality of applications and to shield the conversational system from communications with the applications.

In alternate embodiments, the plurality of different client devices may include at least one of a telephone, a computer, a personal digital assistant, or equivalents. A command may be input to a first client and a result may also be received by the first client. The commands may include graphical commands and speech commands. The results of executing the converted commands may be conveyed to a client device as one of or both of synthesized speech and graphics. The device preference may include a plurality of client devices. The converted commands may include a formal language converted from natural speech. The conversational system may include a dialog manager and a multi-modal history to determine the intent of the converted commands based on a context of the commands. The conversational system preferably includes a mediator which employs information about at least one of the plurality of different client devices and a client device of the device preference to determine the context of the command.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
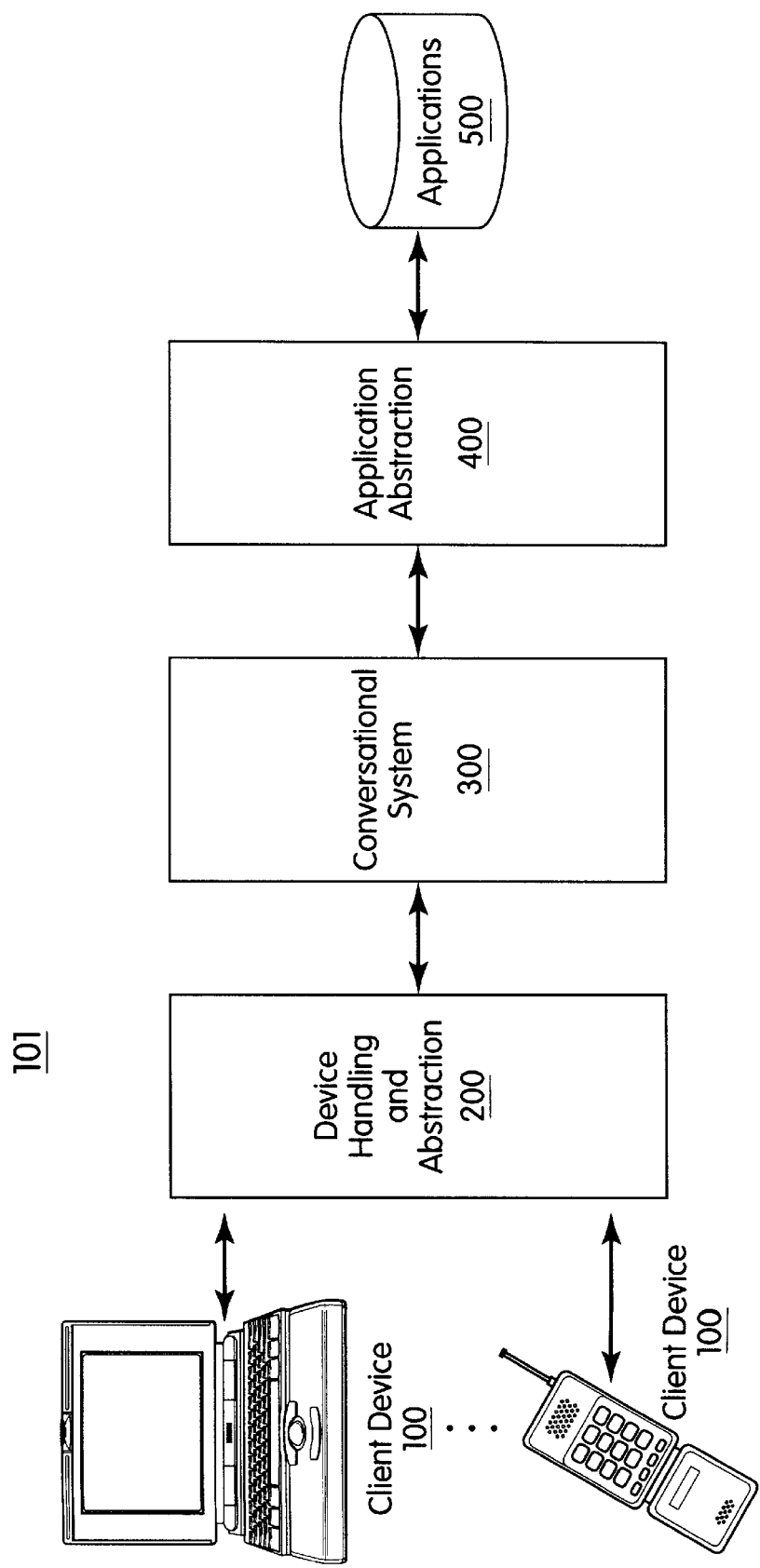
FIG. 1 is a block diagram of an illustrative system architecture which supports multi-client access, in accordance with the present invention.

The present invention is directed to conversational systems which can be accessed from multiple client devices, such as a desktop computer, a telephone, a personal digital assistant (PDA) or other client devices, for example a pager, etc. The invention provides methods for building a conversational system that supports access from multiple client devices, while preserving the "system personality" and conversational context across the access methods. Further, at the same time, the present invention customizes the presentation of information for a particular client device. A conversational speech interface in accordance with the present invention can be accessed from a variety of client devices and can form the basis for a seamless and pervasive interface for information interaction. This invention also supports multiple input modalities (conversational and graphical).

It should be understood that the elements shown in FIGS. 1–5 may be implemented in various forms of hardware, software or combinations thereof. Preferably, these elements are implemented in software on one or more appropriately general purpose digital computers having a processor and memory and input/output interfaces. Referring now to the drawings in which like numerals represent the same or similar elements and initially to FIG. 1, an illustrative example of a system architecture for a system 101 which supports multi-client access, according to the present invention, is shown. A user or users connect to the system 101 via client device 100, examples of which include a computer, a telephone, a personal digital assistant (PDA), etc. A device handling and abstraction subsystem 200 connects the client device 100 and to a conversational system 300. Conversation system 300 is responsible for natural language understanding and dialog management, and connects to an application abstraction system 400. The application abstraction system 400 is responsible for communicating with the application components included within applications 500. Examples of applications may include electronic mail applications, electronic calendar applications, electronic address book applications, spread sheet application, etc. Each component shown in FIG. 1 will now be described in greater detail below.

Figure 2:
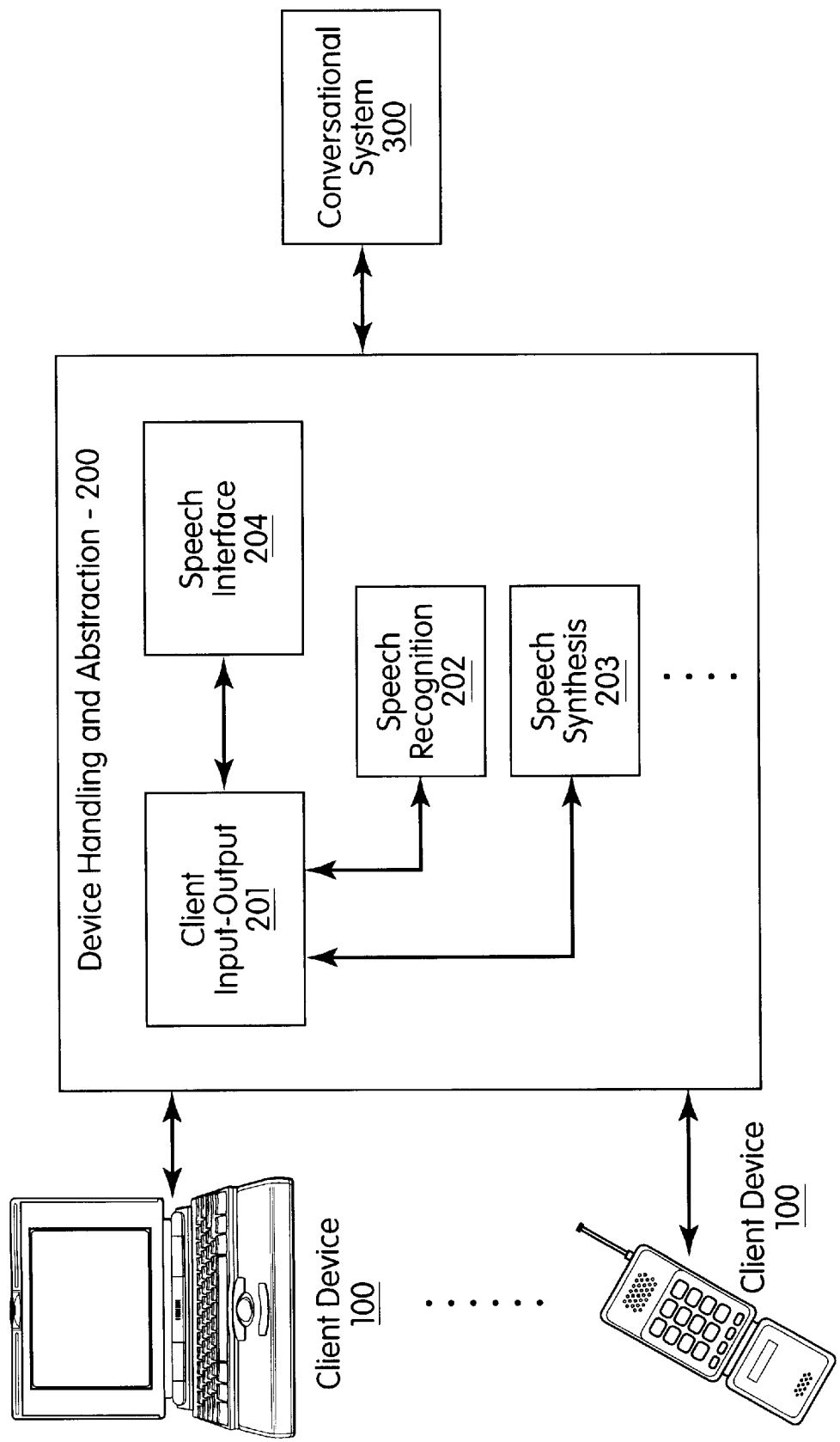
FIG. 2 is a block/flow diagram of an example of a device handling and abstraction system, in accordance with the present invention.

Referring to FIG. 2, device handling and abstraction subsystem 200,.according to the present invention, is schematically shown. The device handling and abstraction subsystem 200 handles the connection to the client device 100. For each type of client device, such as a desktop computer, laptop computer, telephone, PDA, etc., there is a client input-output 201, speech recognition system 202, speech synthesis system 203 and speech interface 204. The client input-output 201 receives the input from the user, which may either be a graphical input or a spoken input, or a combination of both, depending on the capabilities of the client device 100. When the input is a spoken input, speech recognition system 202 performs speech recognition on the spoken input to generate recognized text corresponding to the spoken input. Methods for performing speech recognition are known in the art. The recognized text from speech recognition system 202 is sent to the speech interface 204. The speech interface 204 communicates with conversational system 300, by providing the recognized text and the identity of the client device 100 to the conversational system, and by receiving the response from the conversational system 300. In one embodiment of the invention, the response from the conversational system 300 to the speech interface 204 is in the form a string of text to be converted to speech and played back to the user. The conversion from text to speech is performed by speech synthesis system 203. Methods for text to speech conversion are known in the art. The present invention may be able to utilize speech recognition system 202, speech synthesis system 203 and/or speech interface 204 for different client devices 100 or multiple client devices of a same type, for example on a computer network or a communications network.

Figure 3:
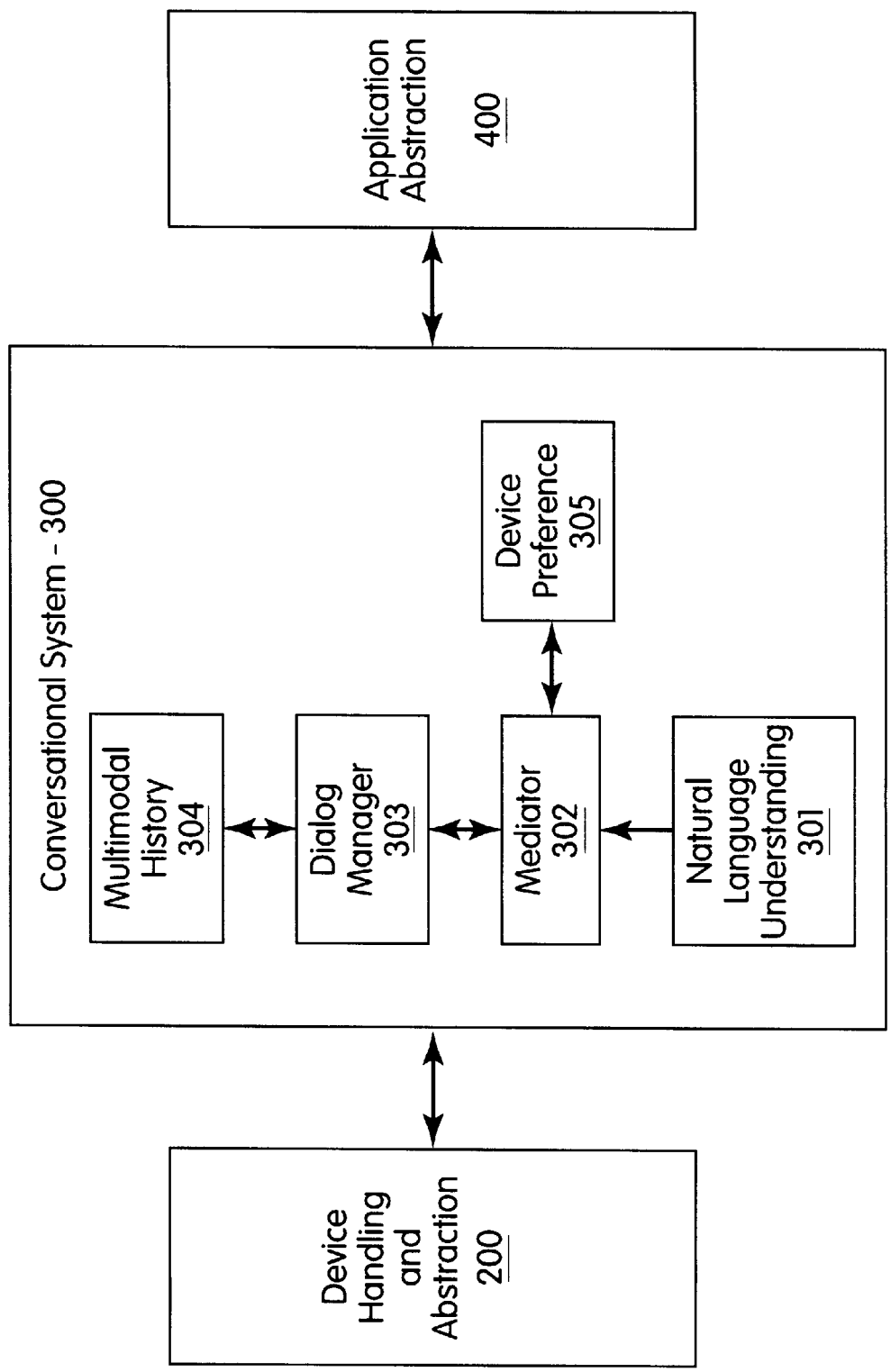
FIG. 3 is a block/flow diagram of an example of a conversational system, in accordance with the present invention.

Referring to FIG. 3, an illustrative example of the conversational system 300, according to the present invention, is schematically shown. The conversational system 300 includes a natural language understanding (NLU) unit 301, a mediator 302, a dialog manager 303, a multi-modal history 304 and a device preference 305. The natural language understanding unit 301 translates the recognized text from the speech recognition system 202 to a formal command corresponding to the user's intention. For example, in an electronic mail application, the user may say, "Please tell me if I have any new messages," or the user may say, "do I have any new mail", and in both cases, the user's input may be translated into a formal command which may be of the form: check_new_mail( ). The formal command, along with the identity of the client device 100 that was used to generate input, is passed to mediator 302.

In accordance with the invention, both the formal language statement and the identity of the input device are passed to the mediator 302. The mediator 302 decides on what decision network (or other element of dialog management, if decision networks are not used) based not only on the formal language statement, but also on the input device 100 (the device that generated the input/command) and the output device (specified in device preference 305). The same formal language statement may result in a different system behavior if the devices involved are different. For example, if a command includes "compose the body of the message" from a desktop, the system will start dictation using speech recognition employed by the desktop computer. However, if a user says the same thing from a telephone, and given that speech recognition accuracy is rather poor from a telephone for large vocabulary composition, the system may instead start audio recording and send the message as an audio attachment. Similarly, the output device (from device preference 305) may also determine the system behavior. For example, if the user says "what appointments do I have tomorrow", the calendar for tomorrow may be displayed on the desktop, but on a telephone, the first few entries or a summary may be read out. Therefore, in accordance with the present invention, the system behavior may depend on the devices involved. The mediator 302 communicates with the device preference 305, which includes the user's preference for the client device 100 to which the output should be presented. In many cases, the output client device 100 would be the same as the input client device 100, but the user may specify a different client device for the output when necessary. For example, the user may choose to generate the input using a telephone, which does not have a graphical display, and have the output sent to a PDA, which does have a graphical display, or to another user's client device. The user may specify the desired output client device using either a graphical input or a spoken input. Using graphical input, the user may open a user preference file in device preference 305 and specify the desired output client device. The output device may include a specific device or a plurality of devices which may be the same or different types of devices. Using spoken input, the user may say "send the output to my desktop", which may be translated to a command of the form "select_device (output_device=desktop)", and the preference will be set.

In one embodiment of the invention, the dialog manager 303 employs decision networks, as described in commonly assigned U.S. application Ser. No. 09/374,744 entitled, "METHOD AND SYSTEM FOR MODELESS OPERATION OF A MULTI-MODAL USER INTERFACE THROUGH IMPLEMENTATION OF INDEPENDENT DECISION NETWORKS," Attorney Docket YO999-277 (8728-300), filed concurrently herewith and incorporated herein by reference. A decision network is a recipe(s) for accomplishing a specific transaction. Other embodiments, such as the embodiments described in U.S. application Ser. No. 09/374,744 entitled, "METHOD AND SYSTEM FOR DETERMINING AND MAINTAINING DIALOG FOCUS IN A CONVERSATIONAL SPEECH SYSTEM," filed concurrently herewith and incorporated herein by reference, may also be used to build the dialog manager 303 and/or the multi-modal history 304. It is to be understood that the multi-modal history 304 captures all events, as well as the devices 100 used to generate the events, and the modality used. All of this information may be needed in some cases to resolve ambiguities, etc. and determine the context of input/commands.

Each combination of formal command and identity of the input and output client devices 100 maps to one decision network. The mediator 302 determines the appropriate decision network to spawn, based on the formal command and the identity of the input and output client devices. Once the appropriate decision network is spawned, the dialog manager 303 communicates with the application abstraction system 400 to accomplish the transaction represented by the formal command. Once the transaction is completed, the response is formatted according to the capabilities of the output client device as specified in device preference 305, and subsequently sent to the output client device for presentation to the user. Formatting of the response is necessary because different client devices will have different capabilities. For example, if the user says "go to the next message," and the output client device is a desktop with a display, then the response may be to highlight the next message, with no audio output. But, if the output client device is a telephone, with no display, then an audio output of form "message selected" may be played out on the output client device.

The multi-modal history 304 captures all system events, both spoken and graphical, from all client devices, and keeps track of the system state. The dialog manager 303 uses the multi-modal history 304 for disambiguation and reference resolution. For example, if the user says "open that", then the dialog manager 303 will communicate with the multi-modal history 304 to resolve which object was referred to by "that". Since all system events are recorded, the user may mix different input modalities (spoken or graphical) on the same client device, or on different client devices. For example, the user may select a message using a mouse click on the desktop, and later say "delete that" from a telephone, and the selected message will be deleted.

Figure 4:
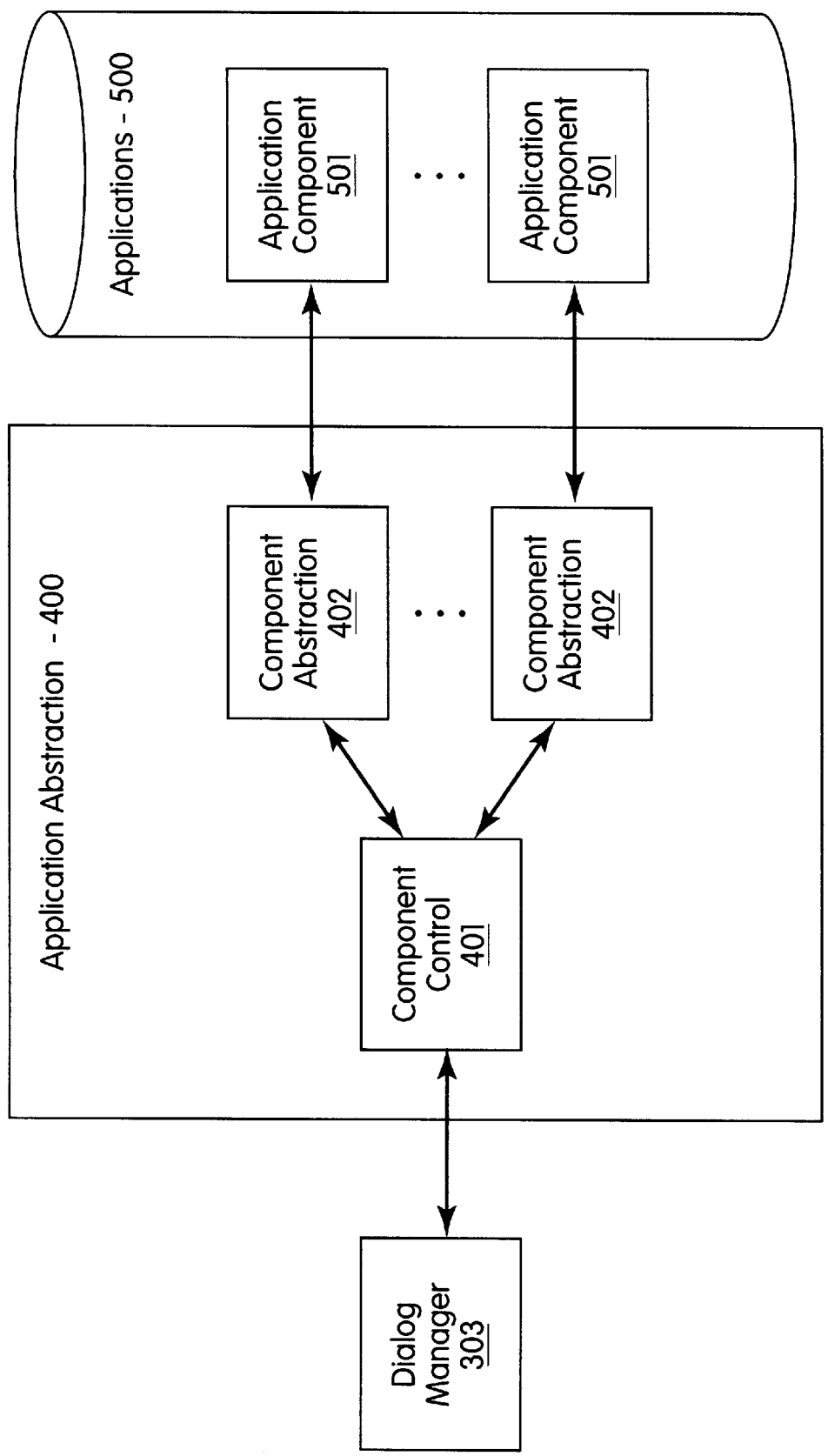
FIG. 4 is a block/flow diagram of an example of an application abstraction system and applications, in accordance with the present invention.

Referring to FIG. 4, an illustrative example of the application abstraction system 400 and applications 500, according to the present invention, is schematically shown. The application abstraction system 400 includes a component control 401 and a set of component abstractions 402 corresponding to each application component 501 in applications 500. Examples of application components 501 are electronic mail, electronic calendars, electronic address books, etc. The component control 401 serves to create instances of and maintain references to the abstraction components 402. In addition, the component control 401 functions as a "switch yard" for forwarding commands to the appropriate application component 501 and accumulating the responses. The application components 501 shield the conversational system 300 (FIGS. 1 and 3) from the details of applications 500, allowing a very high level of communication, since the conversational system 300 does not need to have information on how a specific command is to be accomplished. The applications 500 may therefore be interchanged with no changes necessary to the conversational system 300; only the abstraction components 402 need to be changed.

Figure 5:
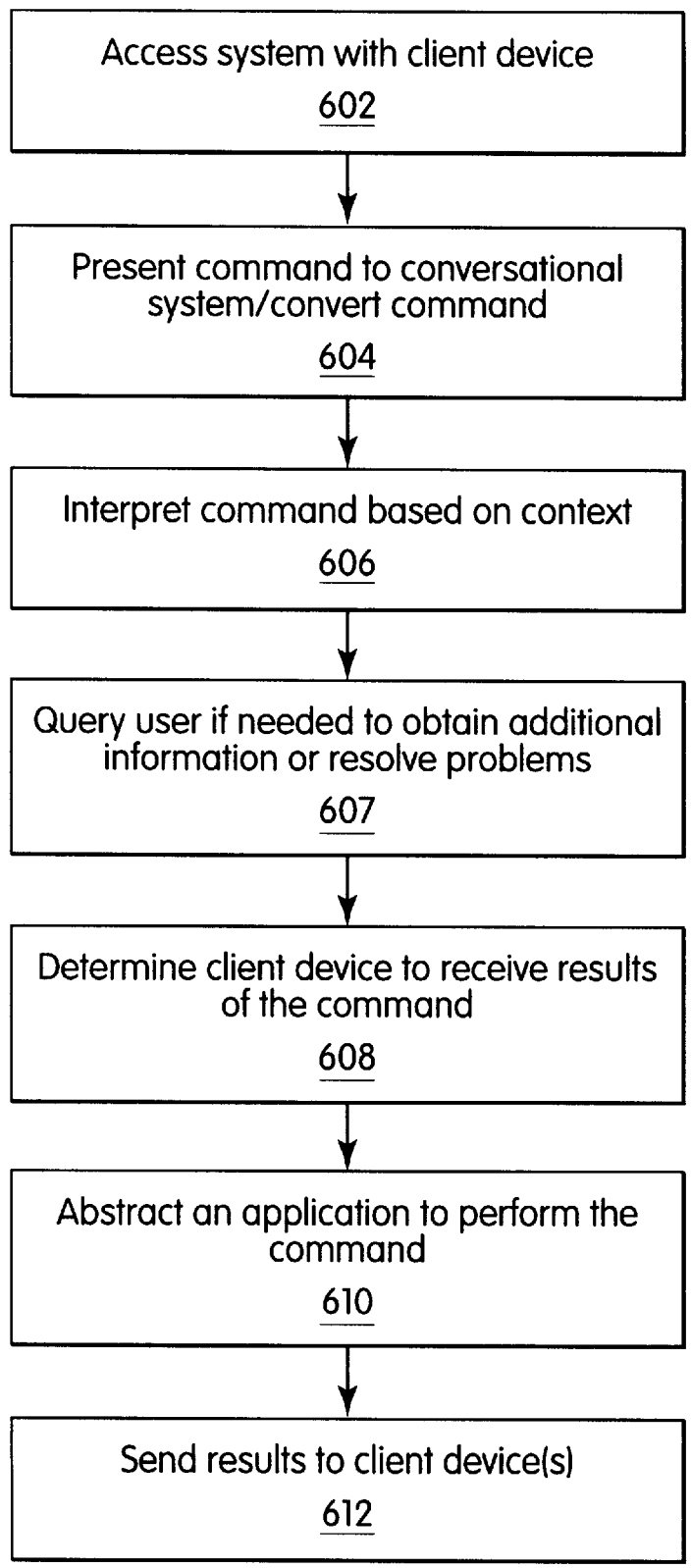
FIG. 5 is a block/flow diagram of a system/method for accessing a dialog system employing a plurality of different clients, in accordance with the present invention.

Referring to FIG. 5, a block/flow diagram is shown for a system/method for accessing a dialog system employing a plurality of different clients in accordance with the invention. The client devices may include at least one of a telephone, a computer, a personal digital assistant, etc. In block 602, a first client device is provided for accessing a conversational system. In block 604, a command is presented to the conversational system by converting the command to a form understandable to the conversational system, for example converting a human utterance to a formal language command.

In block 606, the command is interpreted by employing a dialog manager and a multi-modal history to determine the intent of the command based on a context of the command. The context of the command may be based, at least in part, on the client devices used as an input device or as an output device. In block 607, a user may be queried through the client device to determine additional information, for example, information about the device preference or clarification of the command information. In block 608, a second client device is determined based on a predetermined device preference stored in the conversational system. The predetermined device preference may include the same device, a plurality of devices or a specific other client device. In block 610, an application is abstracted to perform the command, and the results of the performance of the command are sent to the second client device. In block 612, the results of the performance of the command are sent to the second client device for speech synthesis, graphical representation, or both depending on the client devices involved.

The present invention provides a conversational system that supports access from multiple client devices using multiple input modalities. Examples of client devices supported may include desktop computers, telephones, and personal digital assistants (PDAs). The invention describes the overall architecture to support such a conversational system, including the innovations incorporated to preserve the personality and conversational context across multiple access methods, and the innovations incorporated to customize the presentation of information for individual client devices.

Having described preferred embodiments of a method and system for multi-client access to a dialog system (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for accessing a dialog system employing a plurality of different clients comprising:

providing a first client device for accessing a conversational system;

presenting a command to the conversational system by converting the command to a form understandable to the conversational system;

interpreting the command by employing a mediator, a dialog manager and a multi-modal history to determine the intent of the command based on a context of the command;

determining a second client device based on a predetermined device preference;

abstracting an application to perform the command; and sending results of the performance of the command to the second client device.

2. The method as recited in claim 1, wherein the first client device is the same as the second client device.

3. The method as recited in claim 1, wherein the second client device is a plurality of client devices.

4. The method as recited in claim 1, wherein the first client device and the second client device include at least one of a telephone, a computer and a personal digital assistant.

5. The method as recited in claim 1, wherein the command is presented in natural speech, the method further comprising the steps of recognizing the speech and converting the speech to a formal language.

6. The method as recited in claim 5, further comprising the steps of outputting the results of the performance of the command to the second client device by speech synthesis.

7. The method as recited in claim 1, wherein the command is presented graphically, the method further comprising the steps of responding to the command by one or both of a graphical result and synthesized speech.

8. The method as recited in claim 1, further comprising the step providing a component abstraction interface to interface with applications such that the conversational system is shielded from details of execution of the application.

9. The method as recited in claim 1, further comprising the step querying a user via the first client device for one of information about the device preference and clarification of command information.

10. The method as recited in claim 1, wherein the mediator employs information about one of the first client device and the second client device to determine the context of the command.

11. A program storage device readable by machine, tangibly embodying a program of instructions executable by the machine to perform method steps for accessing a dialog system employing a plurality of different clients, the method steps comprising:

providing a first client device for accessing a conversational system;

presenting a command to the conversational system by converting the command to a form understandable to the conversational system;

interpreting the command by employing a mediator, a dialog manager and a multi-modal history to determine the intent of the command based on a context of the command;

determining a second client device based on a predetermined device preference;

abstracting an application to perform the command; and sending results of the performance of the command to the second client device.

12. The program storage device as recited in claim 11, wherein the first client device is the same as the second client device.

13. The program storage device as recited in claim 11, wherein the second client device is a plurality of client devices.

14. The program storage device as recited in claim 11, wherein the first client device and the second client device include at least one of a telephone, a computer and a personal digital assistant.

15. The program storage device as recited in claim 11, wherein the command is presented in natural speech, the method further comprising the steps of recognizing the speech and converting the speech to a formal language.

16. The program storage device as recited in claim 15, further comprising the steps of outputting the results of the performance of the command to the second client device by speech synthesis.

17. The program storage device as recited in claim 11, wherein the command is presented graphically, the method comprising the steps of responding to the command by one or both of a graphical result and synthesized speech.

18. The program storage device as recited in claim 11, further comprising the step providing a component abstraction interface to interface with applications such that the conversational system is shielded from details of execution of the application.

19. The program storage device as recited in claim 11, further comprising the step querying a user via the first client device for one of information about the device preference and clarification of command information.

20. The program storage device as recited in claim 11, wherein the mediator employs information about one of the first client device and the second client device to determine the context of the command.

21. A system for accessing a dialog system employing a plurality of different clients, comprising:

a device handling and abstraction system adapted to provide input and output interfacing to a plurality of different client devices, the device handling and abstraction system for receiving commands from at least one client device and converting the commands to a form acceptable to a conversational system;

the conversational system coupled to the device handling and abstraction system for receiving converted commands, the conversational system adapted to interpret the converted commands based on a context of the command to determine an appropriate application responsive to the converted command, the conversational system including a device preference to which results of executing the converted commands are sent; and an application abstraction system coupled to the conversational system and adapted for determining which applications are appropriate for executing the converted command, the application abstraction system being adapted to interface with a plurality of applications and to shield the conversational system from communications with the applications.

22. The system as recited in claim 21, wherein the plurality of different client devices include at least one of a telephone, a computer and a personal digital assistant.

23. The system as recited in claim 21, wherein a command is input to a first client and a result is received by the first client.

24. The system as recited in claim 21, wherein the commands include graphical commands and speech commands.

25. The system as recited in claim 21, wherein the results of executing the converted commands are conveyed to a client device as one of or both of synthesized speech and graphics.

26. The system as recited in claim 21, wherein the device preference includes a plurality of client devices.

27. The system as recited in claim 21, wherein the converted commands include a formal language converted from natural speech.

28. The system as recited in claim 21, wherein the conversational system includes a dialog manager and a multimodal history to determine the intent of the converted commands based on a context of the commands.

29. The system as recited in claim 21, wherein the conversational system includes a mediator which employs information about at least one of the plurality of different client devices and a client device of the device preference to determine the context of the command.

\* \* \* \* \*